US012708966B1

(12) United States Patent
Tobias et al.

(10) Patent No.: US 12,708,966 B1
(45) Date of Patent: Aug. 18, 2026

(54) WELDING ENCLOSURE WITH MAGNETIC-LATCHING DOORWAY

(71) Applicant: Gulf Island Fabrication, Inc., Houma, LA (US)

(72) Inventors: Benjamin Tobias, Houma, LA (US); Paul Ray, Houma, LA (US)

(73) Assignee: Gulf Island Fabrication, Inc., Houma, LA (US)

( * ) Notice: Subject to any disclaimer, the term of this patent is extended or adjusted under 35 U.S.C. 154(b) by 235 days.

(21) Appl. No.: 18/463,067

(22) Filed: Sep. 7, 2023

Related U.S. Application Data

(60) Provisional application No. 63/374,768, filed on Sep. 7, 2022.

(51) Int. Cl.

| | |
|---|---|
| ***B23K 37/006*** | (2025.01) |
| ***A62C 2/06*** | (2006.01) |
| ***B23K 26/12*** | (2014.01) |
| ***E04B 1/94*** | (2006.01) |
| ***E04H 15/58*** | (2006.01) |
| ***E06B 5/16*** | (2006.01) |
| ***E21B 35/00*** | (2006.01) |
| ***G08B 17/12*** | (2006.01) |

(52) U.S. Cl.
CPC .............. *B23K 37/006* (2013.01); *A62C 2/06* (2013.01); *B23K 26/127* (2013.01); *E04B 1/947* (2013.01); *E04B 1/948* (2013.01); *E04H 15/58* (2013.01); *E06B 5/16* (2013.01); *E06B 5/162* (2013.01); *E06B 5/164* (2013.01); *E21B 35/00* (2013.01); *G08B 17/125* (2013.01); *Y10S 135/90* (2013.01)

(58) Field of Classification Search
CPC ............................ B23K 26/127; Y10S 135/90
See application file for complete search history.

(56) References Cited

U.S. PATENT DOCUMENTS

| | | | | |
|---|---|---|---|---|
| 1,965,542 A * | 7/1934 | Colvin, Jr. | ............. | D02G 3/441 160/DIG. 7 |
| 3,691,688 A * | 9/1972 | Kaiserswerth | ....... | H05K 9/0015 49/478.1 |
| 4,084,597 A * | 4/1978 | Compton | .............. | E04H 15/001 135/117 |
| 4,590,710 A * | 5/1986 | Newland | ............... | E05C 19/161 49/478.1 |

(Continued)

FOREIGN PATENT DOCUMENTS

| | | | |
|---|---|---|---|
| CA | 2522507 A1 * | 4/2006 | ............... G21F 9/28 |
| WO | WO-9315293 A1 * | 8/1993 | ............. E04H 15/42 |

*Primary Examiner* — Robert Canfield
(74) *Attorney, Agent, or Firm* — Jones Walker LLP

(57) ABSTRACT

A pressurized welding enclosure is disclosed that features a magnetic latching mechanism to securely seal entry doors so as to prevent the emission of flammable debris during hot work operations. The main entry door may also incorporate a spark filter that allows air pressure equalization between the main welding enclosure and the airlock chamber, while still preventing the emission of flammable debris. The welding enclosure preferably utilizes an optical flame detector to monitor the hot work station for a reflash event after hot work operations have ceased, and an automated water deluge system may be used to extinguish any fire detected by the optical flame detector.

22 Claims, 6 Drawing Sheets

(56) References Cited

U.S. PATENT DOCUMENTS 4,758,465 A * 7/1988 McKinney ........... D06N 3/0059 442/139
4,996,099 A * 2/1991 Cooke ..................... D02G 3/38 442/364
5,091,243 A * 2/1992 Tolbert ................ A47C 31/001 428/920
5,101,604 A * 4/1992 Wardlaw, III ........... E21B 35/00 135/900
5,252,387 A * 10/1993 Samson .................. D06N 3/14 442/84
5,789,025 A * 8/1998 St. Clair ................ D06N 3/128 427/245
5,985,773 A * 11/1999 Lee ......................... D06N 3/14 442/131
6,017,637 A * 1/2000 St. Clair ................ D06N 3/125 428/447
6,179,367 B1 * 1/2001 Bowen .................... E04H 15/20 135/124
6,296,297 B1 * 10/2001 Barrow ................... B60P 3/341 296/168
6,858,550 B2 * 2/2005 Ahluwalia ........... A47C 31/001 428/920
7,091,848 B2 * 8/2006 Albarado ............. B23K 26/127 340/3.1
7,361,617 B2 * 4/2008 Ahluwalia ............... C09D 5/18 428/920
7,521,385 B2 * 4/2009 Ahluwalia ............ E04D 12/002 428/920
7,981,819 B2 * 7/2011 Ahluwalia .............. C03C 25/47 428/920
8,822,355 B2 * 9/2014 Ahluwalia ............. D06M 11/72 428/920
8,822,356 B2 * 9/2014 Ahluwalia ............... D06N 7/00 428/920
8,851,198 B2 * 10/2014 Burnham ............. A62C 3/0257 169/48
8,947,249 B1 * 2/2015 Dore ....................... F27D 21/04 340/3.1
8,987,149 B2 * 3/2015 Ahluwalia ........... D06N 3/0056 428/920
10,151,032 B2 * 12/2018 Thompson ................ B32B 5/30
12,146,244 B1 * 11/2024 Ashley ................. D03D 15/283
2005/0028855 A1 * 2/2005 Deblois .................. E04H 15/32 135/117
2006/0060235 A1 * 3/2006 Ball ...................... E04H 15/322 135/136
2006/0240391 A1 * 10/2006 Sovine .................. G09B 9/003 434/219
2008/0210283 A1 * 9/2008 Hinz ....................... E04H 15/32 135/117
2014/0179216 A1 * 6/2014 Walters .................. F24F 3/167 454/187
2014/0318022 A1 * 10/2014 Bell .......................... E06B 7/16 49/478.1

* cited by examiner 1
3
7
9
60
15
5

22
23
16
25
18
31
30
19
33
37

45
16
23
72

23
73
74

WELDING ENCLOSURE WITH MAGNETIC-LATCHING DOORWAY

CROSS-REFERENCE TO RELATED APPLICATION

This application claims the benefit under 35 U.S.C. § 119(e) of U.S. Provisional Application No. 63/374,768, filed Sep. 7, 2022, which is hereby incorporated by reference herein in its entirety.

BACKGROUND OF THE INVENTION

Hot work is generally understood to be any operation that can produce heat from flame, spark or other source of ignition with sufficient energy to ignite flammable vapors, gases, or dust. Hot work includes such things as electric arc and gas welding, chipping, grinding, cutting, abrasive blasting, brazing, and soldering. When it becomes necessary to conduct hot work near equipment in service with hydrocarbons present, e.g., offshore production platforms, oil and gas pipelines, wellbays, etc., it is critically important to the safety of the workers present to avoid an accidental ignition. An accidental fire can ignite during hot work operations and even after hot work is completed in an event known as reflash. These fires could potentially grow from an incipient stage fire to a catastrophic fire that could result in injury to personnel, damage to equipment, or release into the environment.

A Pressurized Welding Enclosure (PWE) is a fully enclosed area that is safe for hot work near classified environments or otherwise dangerous conditions. A typical PWE is constructed of flame-retardant textiles or fabrics attached to a support structure, generally made of industrial grade scaffolding, and include ingress/egress door(s) and emergency egress door(s). Ingress/egress and emergency doors are typically formed by flame-retardant fabrics that are sealed by zippers and disposed on rigid door frames, and some also include an air lock chamber that surrounds the ingress/egress door(s). Conventional PWEs also typically utilize a means for delivering fresh air into the welding enclosure, a means of monitoring atmospheric conditions inside and outside of the welding enclosure and at the location of the equipment used to force clean air into the enclosure, a means for monitoring the differential pressure between ambient outside pressure and the pressure within the welding enclosure, and a means to effectively interface with and control all hot work equipment used in the welding enclosure.

Conventional PWE's have several deficiencies. The conventional zipper doors are ineffective in containing flammable debris from hot work operations due to holes in zippers on the soft-panel doors and gaps in the flanges of the rigid door frames. Further, conventional PWEs have no means of detecting reflash fire occurrences after the completion of hot work and have no means of extinguishing these reflash fire occurrences unless the welding enclosure is manned at the time of the fire. Currently, regulations require a human worker to monitor the welding location for reflash events during a "cool-down" period of at least 30 minutes after hot work operations have ceased. Numerous issues arise as a result, including failures to detect early signs of reflash events during the cool-down period due to human error and failures to detect reflash events that occur after the 30-minute cool-down period has ended.

SUMMARY OF THE INVENTION

The invention disclosed herein is directed to an improved welding enclosure having a magnetic latching mechanism for the welding enclosure. The magnetic latching mechanism provides a more fail-proof closure mechanism for the door, thereby preventing exterior gases from entering the hot working region. The improved welding enclosure also preferably includes an optical flame detector positioned on an interior surface of the main enclosure housing for detecting reflash occurrences, thereby eliminating the risks of human error associated with reflash monitoring of conventional PWE's.

In a particular embodiment exemplifying the principles of the invention, the welding enclosure can include a main enclosure housing constructed out of flexible, fire-resistant fabric. The welding enclosure may have an enclosure entry door that includes a door frame, an entry door, and a door closure mechanism. The door frame is connected to the welding enclosure, while the entry door is preferably connected to the door frame with one or more door hinges. The door closure mechanism features door closure magnets positioned on at least one of the door and the door frame in order to magnetically hold the door in a closed position with respect to the door frame. In certain embodiments, the welding enclosure can further include an airlock chamber connected to the main enclosure. Like the main enclosure, the airlock chamber may also feature a door frame, an entry door, and a door closure mechanism comprising a plurality of magnets positioned on the door and/or the door frame in order to magnetically hold the door to the door frame in a closed position.

In certain embodiments, the welding enclosure may also include an optical flame detector is positioned on an interior surface of the main enclosure housing. Upon detecting a potential flame, the optical flame detector transmits a flame detection signal to a control panel positioned outside of the main enclosure housing. In certain embodiments, the optical flame detector generates a detection signal upon sensing light in the UV or IR spectrum. In operation, an individual may conduct welding operations upon an object within the welding enclosure with the optical flame detector positioned within the welding enclosure. The optical flame detector will monitor the object for at least 30 minutes after the welding operations on the object cease. Should the flame detector detect a flame, it will transmit a detection signal through a communication link to an external alarm. The external alarm may comprise an audible/visible alarm inside the welding enclosure, an alarm outside of the welding enclosure, or a water deluge system that engulfs the inside of the welding enclosure with water of another fire suppressant.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention.

DETAILED DESCRIPTION OF THE INVENTION

Figure 1:
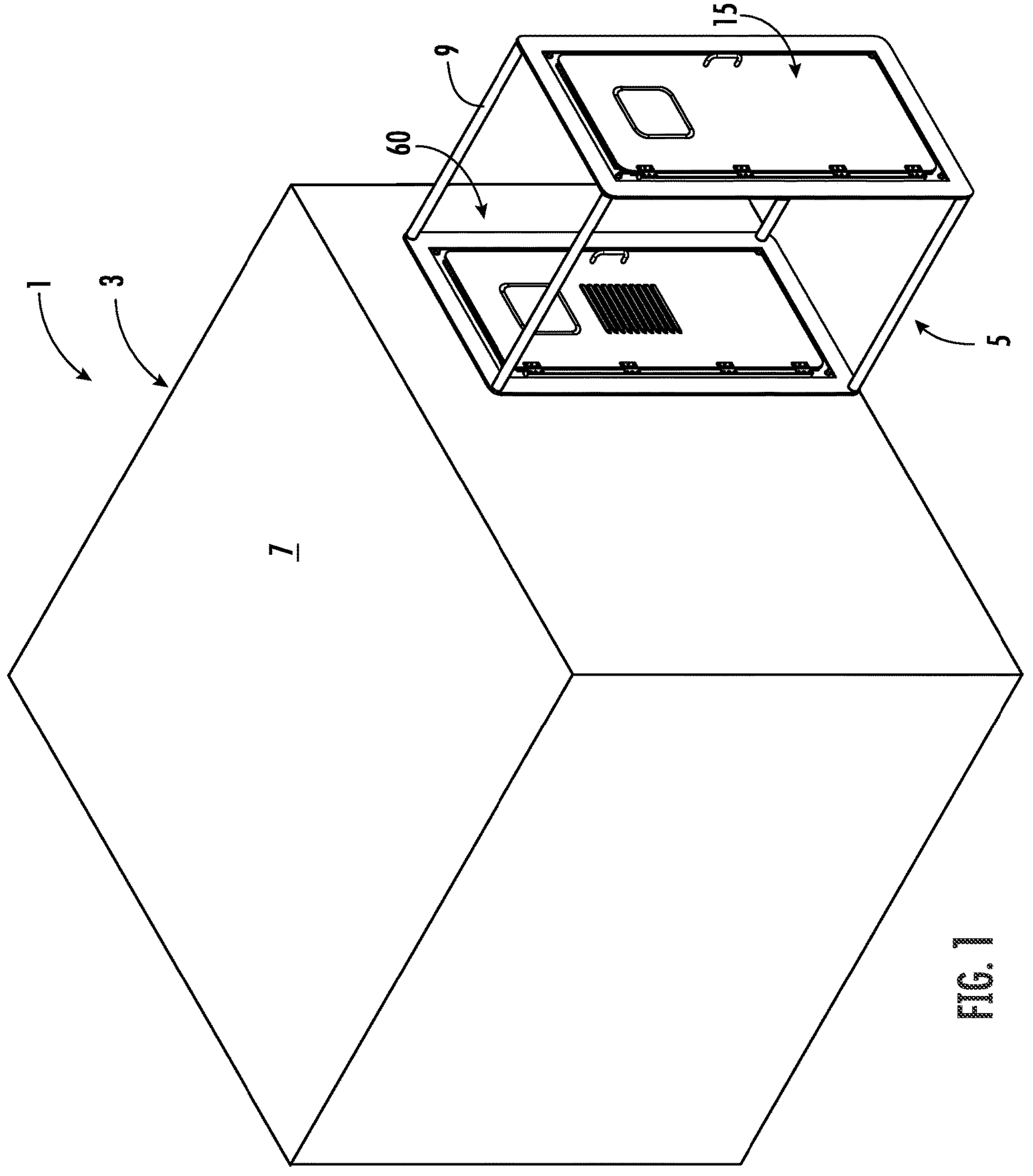
FIG. 1 is a perspective view of one embodiment of a welding enclosure.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one entity or action from another entity or action without necessarily requiring or implying any actual such relationship or order between such entities or actions. Herein various embodiments of the present invention are described. To avoid redundancy, repetitive description of similar features may not be made in some circumstances.

FIGS. 1-9 depict exemplary embodiments of a welding enclosure exemplifying the principles of the invention. Referring now to FIG. 1, the welding enclosure 1 can comprise a main enclosure housing 3 that is accessed via a main enclosure entry door assembly 45 inside an airlock chamber 5. The airlock chamber 5 is accessed by an airlock entry door assembly 15. The airlock chamber 5 preferably has at least three feet of spacing between the main entry door assembly 45 and the airlock entry door assembly 15 to allow adequate space for a person to open the door, enter the airlock chamber, and close the door behind them. Frame members 9 define the edges of the welding enclosure 1, and the frame members 9 are covered by walls constructed out of flexible, fire-resistant fabric 7. One example of this flexible, fire-resistant fabric is Armatex SF22 silicone coated fiberglass fabric available from Mid-Mountain Materials, Inc. of Seattle, Washington. In another embodiment, the welding enclosure 1 does not include an airlock chamber 5 at all, and only utilizes the main entry door assembly 45.

FIGS. 2-6 depict various features of the airlock entry door assembly 15. In certain embodiments, the main entry door assembly 45 has identical features of the airlock entry door assembly 15. However, to avoid redundancy, the embodiment of the door assembly depicted in FIGS. 2-6 will be discussed in the context of the airlock entry door assembly 15.

Figures 2, 3:
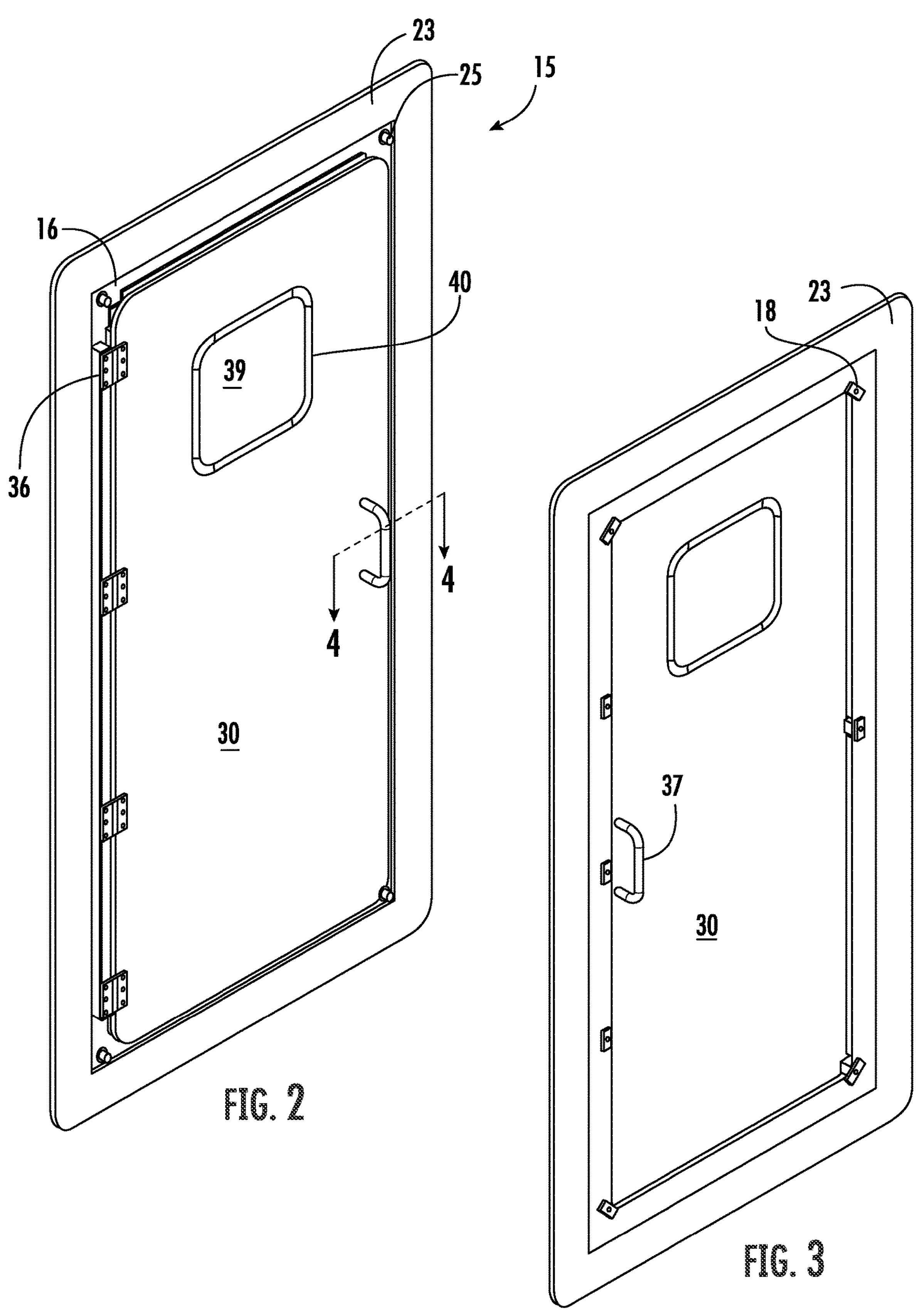
FIG. 2 is a perspective view of the exterior side of an embodiment of the airlock entry door assembly.
FIG. 3 is a perspective view of the interior side of an embodiment of the airlock entry door assembly.

Turning to FIGS. 2-3, the exterior and interior sides of an embodiment of the airlock entry door assembly 15 are depicted. The airlock entry door assembly 15 comprises an airlock door 30 attached to a door frame 16 via hinges 36. In a preferred embodiment, the door 30 and door frame 15 are made of metal. One example of such a material is aluminum or an aluminum alloy, such as Alum 6061 T6. The door 30 also includes a door handle 37, a window 39, and window trim 40.

The door frame 16 preferably mates to the welding enclosure 1 via a hook and loop connector material 23. One example of the hook and loop connector material is 4" Flame Retardant Hook and Loop with Type 9 FR Adhesive (FRABH400 and FRABL400) available from Halco USA, Inc. of Hayward, CA. Alternatively, the door frame 16 could connect to the welding enclosure 1 using any other suitable means known in the art. In the embodiment depicted in FIGS. 2-3, the airlock door frame 16 has adhesive hook and loop connector material 23 on its interior and exterior surfaces to correspond to adhesive hook and loop connector material on the fire-resistant fabric 7 of the airlock chamber 5, which may optionally be attached to either the interior or exterior surface of the airlock door frame 16 depending on user preference or the environment in which operations are being conducted. Additionally, the adhesive hook and loop connector material 23 on the interior surface of the main door frame 46 will correspond to adhesive hook and loop carrying material on the fire-resistant fabric 7 of the main enclosure housing 3. Similarly, the adhesive hook and loop connector material 23 on the exterior surface of the main door frame 46 will correspond to adhesive hook and loop carrying material on the fire-resistant fabric 7 of the airlock chamber 5.

In the embodiment depicted in FIG. 2, a plurality of eye bolts 25 are installed around the edge of the exterior side of the door frame 16. These eye bolts 25 function as anchor points to secure the door frame 16 to the frame members 9 via rope or hook that is threaded through the eye bolts 25 and secured to the frame members 9 for rigidity. In other embodiments, these eye bolts could alternatively be installed on the interior side of the door frame 16 or on both sides to allow the user the option of securing the door frame 16 from the interior, exterior, or both.

Figure 4:
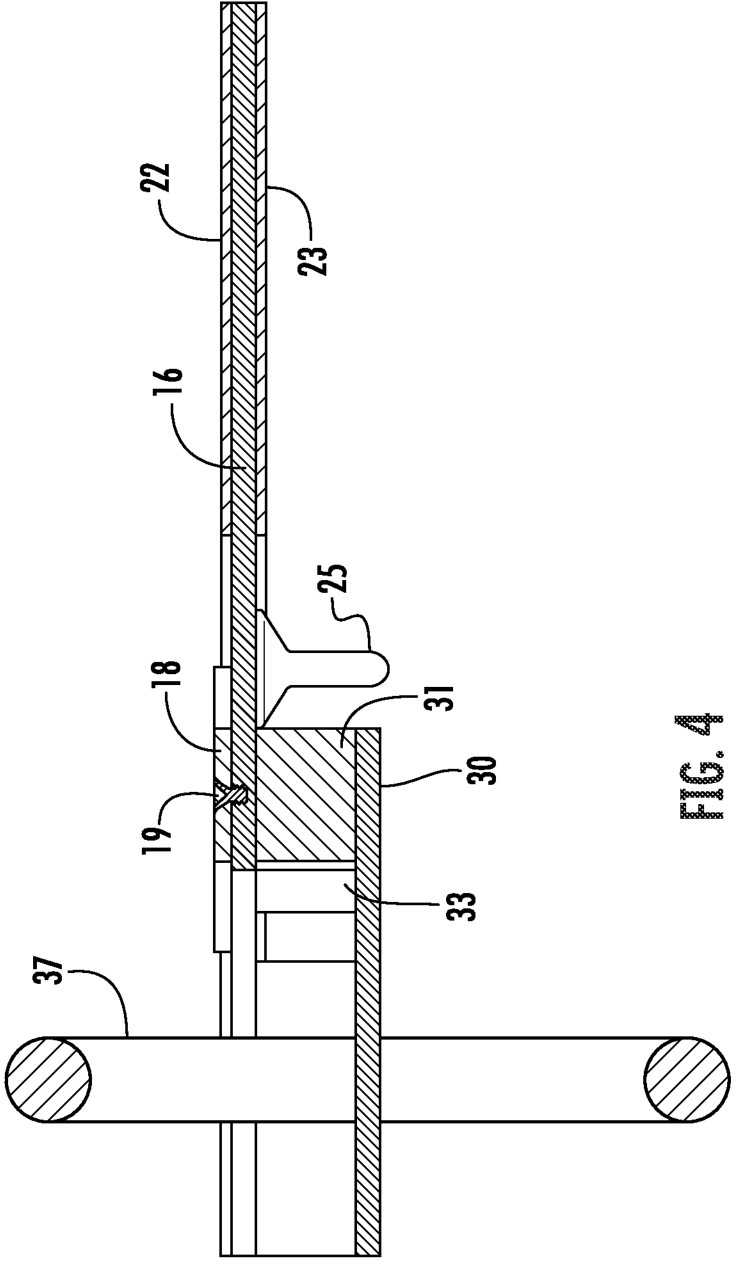
FIG. 4 is a cross-sectional view along the line 4-4 shown in FIG. 2.

Each door assembly 15 uses a plurality of door closure magnets 31 to hold the door assembly 15 in a closed position. One example of suitable door closure magnets 31 is 1"×1"×½" NdFeB, grade N42 plastic coated magnets (BX0X08DCSPC-BLK) available from K&J Magnetics, Inc. of Pipersville, PA. In the embodiment shown in FIGS. 5-6, the door closure magnets 31 are spaced around the edge of the interior side of the door 30, and their locations correspond to the locations of ferrous metal tabs 18 on the edge of the exterior side of the door frame 16. FIG. 4 depicts a cross-sectional view of the door assembly 15 in the closed position, where one of the plurality of door closure magnets 31 attached to the door 30 is in magnetic engagement with one of the plurality of ferrous metal tabs 18 attached to the door frame 16. In this exemplary embodiment, the ferrous metal tabs 18 are attached to the door frame 16 via retaining screws 19, but any other suitable means of attachment may be used as well.

A person of skill in the art will readily recognize that there are a variety of alternative arrangements of the magnets 31 and/or tabs 18 that achieve the same magnetic-locking function. For example, the magnets could be positioned on the door frame while the ferrous metal tabs are positioned on the door. In another alternative embodiment, both the door and the door frame have magnets positioned approximately opposite each other, and no ferrous metal tabs are used. Additionally, the metal tabs are not limited to iron, but instead can be made of any magnetic material. In any embodiment, at least five and no more than fifty pounds of force should be required to overcome the attractive forces of the door closure magnets without overcoming the attachment forces of the hook and loop connector material.

Figures 5, 6:
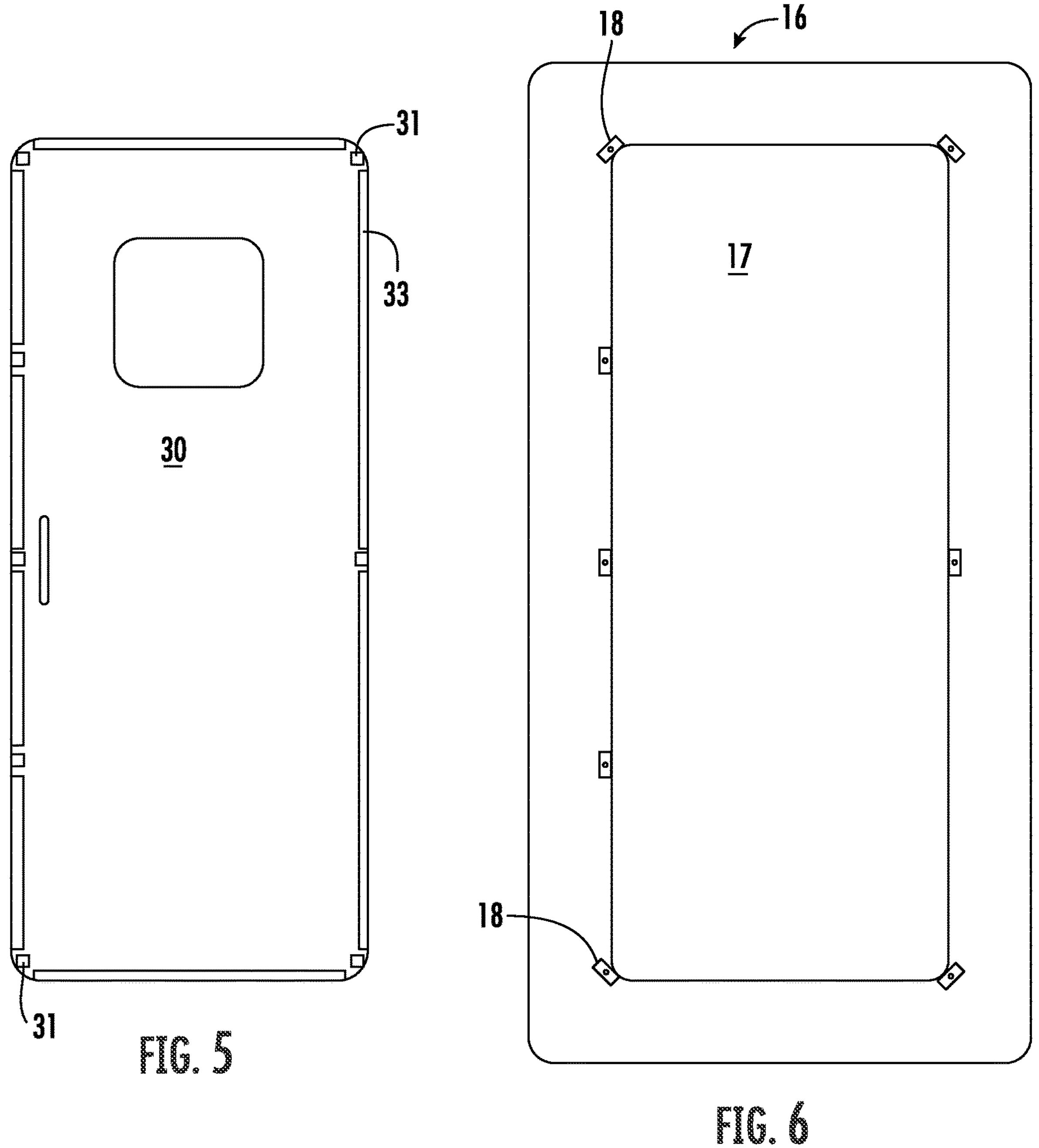
FIG. 5 is a planar view of the interior side of an embodiment of the airlock entry door.
FIG. 6 is a planar view of the exterior side of an embodiment of the airlock entry door frame.

In some embodiments, the door 30 also comprises an elastomeric sealing strip, or weather stripping 33, that extends across all the edges of the door 30 so that it separates the door 30 from the door frame 16 and seals the entire perimeter of the door when the magnets 31 are latched upon closing. One example material for the elastomeric strip includes a closed cell, flame-resistant, adhesive backed 1"×0.5" EPDM Neoprene SBR Strip sold under the designation CNES591/2X1X50T by E. James & Company of Chicago, IL. The seal created by the combination of magnets 31 and weather stripping 33 makes the doors of the present invention more effective in containing flammable debris than the prior art. The weather stripping 33 can include gaps in which the plurality of door closure magnets 31 is interspersed, as depicted in the embodiment of FIG. 5, or the weather stripping 33 can run adjacent to the plurality of door closure magnets 31, as depicted in FIG. 4. In a preferred embodiment, the weather stripping 33 should extend further away from the door 30 than the magnets 31 by at least ⅛th of an inch. FIG. 6 depicts an exemplary embodiment of the door frame 16 without the door 30 attached, allowing the door frame opening 17 to be visible.

Figures 7, 8:
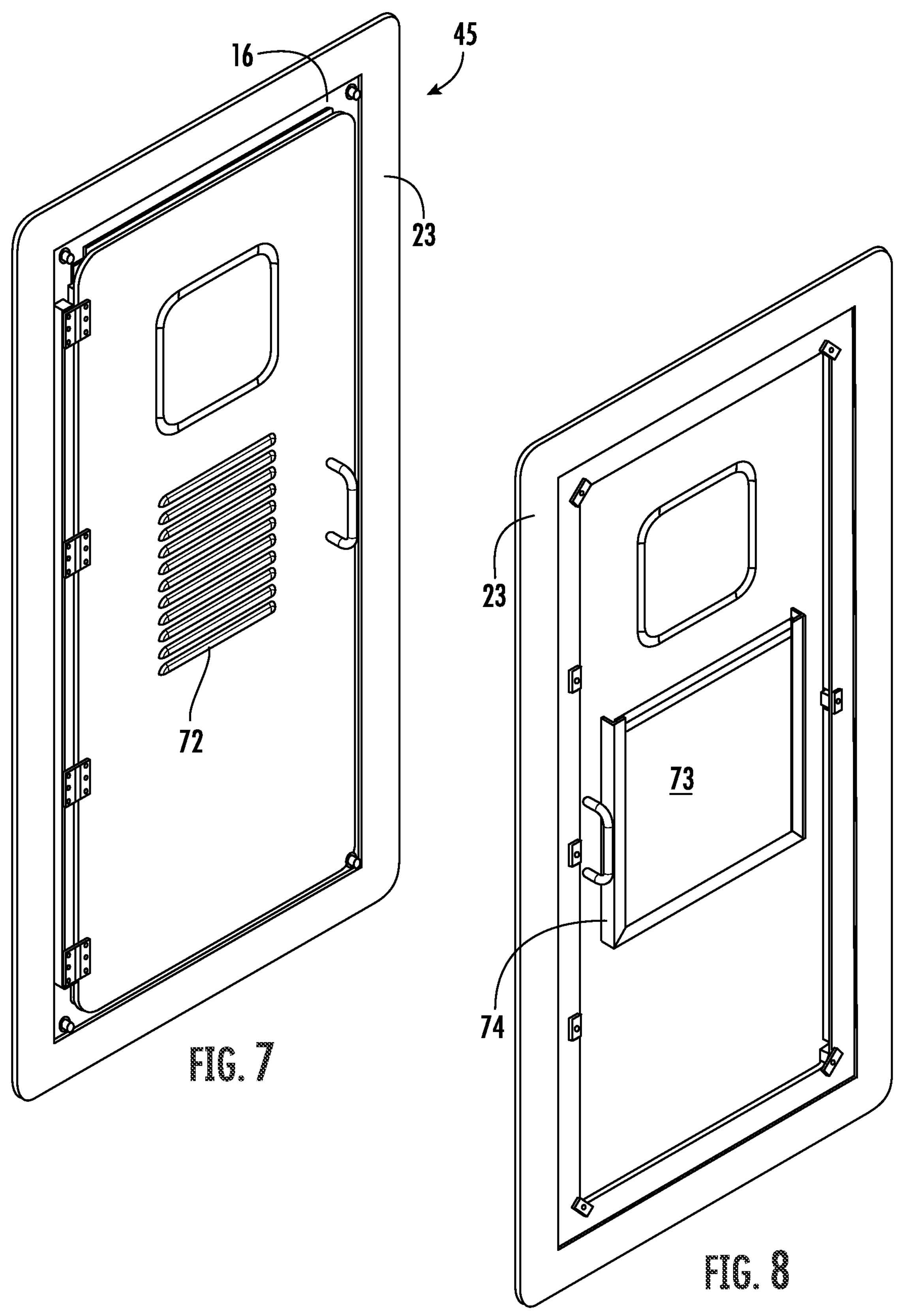
FIG. 7 is a perspective view of the exterior side of an embodiment of the enclosure entry door assembly.
FIG. 8 is a perspective view of the interior side of an embodiment of the enclosure entry door assembly.

FIGS. 7-8 show another embodiment of the main entry door assembly 45. In this embodiment, the main door 60 has a series of vent slots 72 on the exterior side and a vent filter frame 74 on the interior side. The vent filter frame 74 creates a slot or housing to hold a spark arresting filter 73 in place, positioned over the vent slots on the exterior side. This unique vent system allows air to equalize from the interior of the main enclosure 3 into the airlock chamber 5, while preventing the escape of flammable materials and debris into the airlock chamber 5 during hot work.

Figure 9:
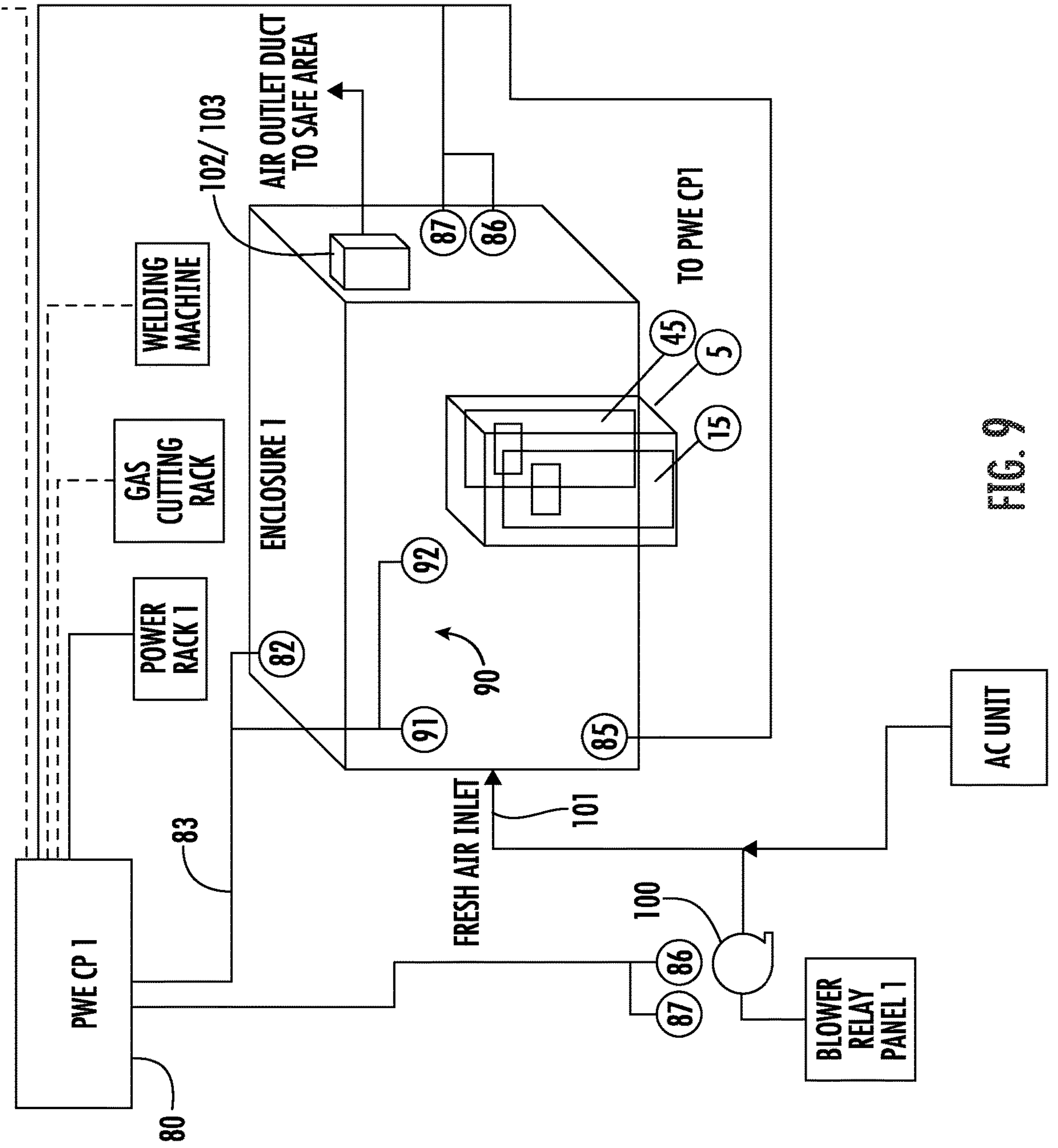
FIG. 9 is a schematic view of the electrical layout for an embodiment of the enclosure.

Turning now to FIG. 9, the welding enclosure 1 may further comprise a blower 100, an air inlet 101, an air outlet 102, and a spark filter 103. These components function together to remove air contaminants and supply fresh air during welding operations, while the spark filter 103 provides an additional layer of protection to prevent flammable debris from escaping the enclosure through the air outlet 102. In addition, the welding enclosure 1 may include a system for monitoring and managing the operations of the welding enclosure 1. This system uses a control panel 80 with both electrical and pneumatic connections to sensors and operational equipment both inside and outside the enclosure 1. Sensors can include $O_2$ detectors 86, combustible gas detectors 87, and/or low-pressure sensors 85. When a sensor detects a dangerous condition, it transmits an alert signal to control panel 80, which in turn triggers a safety response such as shutting down welding operations, power racks, gas (fuel) supply to gas cutting torches, welding machines, or other equipment. These operations are all typical of prior art welding enclosures 1.

In the welding enclosure 1 of the present invention, this control system features an optical flame detector 82 and a water deluge system 90 positioned inside the main enclosure housing 3 for detecting and responding dangerous conditions within the welding enclosure after completion of hot work, thereby preventing reflash events. Thus, when the welding enclosure 1 is enabled and ready for hot work, the optical flame detector 82 and water deluge system 90 are disabled. When the welding enclosure 1 is "disabled" and all hot work has ceased, the flame detector 82 and deluge system 90 are activated so that the welding enclosure 1 is protected. This system replaces the need for a human worker to stand watch inside the welding enclosure 1 during a "cool down period" after operations have ceased, thereby eliminating human error and providing a longer period of monitoring.

One example of the optical flame detector 82 of the present invention is the MSA FL500 Visual Flame Detector available from MSA Inc. of Pittsburgh, PA. The optical flame detector 82 may be removably attached to an interior surface of the main enclosure housing 3 by a temporary connector, thereby allowing the optical flame detector 82 to connect to multiple different locations within the main enclosure housing 3 where the detector 82 will have a direct line of sight to the object being welded. The temporary connector may be any suitable means for removable attachment, including a hook, a clamp, or a section of hook and loop material. The optical flame detector 82 incorporates technology to detect the presence of a flame using ultraviolet/infrared flame signatures. The optical flame detector 82 generates signal upon sensing light in the UV or IR spectrum and then directs that signal to a control panel 80 positioned outside the main enclosure housing 3. In the embodiment of FIG. 9, the communication link between the optical flame detector 82 and the control panel 80 is established via electrical cable 83, but in alternative embodiments this communication link may be established through any other suitable means, including Bluetooth or Wi-Fi. Once the flame detection signal is received by the control panel 80, the control panel activates an audible/visible alarm to alert personnel that a reflash event has occurred. In embodiments including a water deluge system 90, the control panel 80 also immediately triggers the deluge solenoid valve 91 to open, which will allow facility fresh water to flow through the deluge header 92 to effectively extinguish and prevent the growth of the flame.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A welding enclosure comprising:

(a) a main enclosure housing including a flexible, fire-resistant fabric;

(b) an airlock chamber connected to the main enclosure housing;

(c) a main enclosure entry door assembly including: (i) a metal door frame connected to the main enclosure housing; (ii) a metal door hinged to the door frame; and (iii) door closure magnets positioned on at least one of the door and the door frame in order to magnetically hold the door to the door frame in a closed position; and (d) an airlock entry door assembly including: (i) a metal door frame connected to the airlock chamber with a hook-and-loop connector material; (ii) a metal door hinged to the door frame; (iii) door closure magnets positioned on the door and the door frame in order to magnetically hold the door to the door frame in a closed position.

2. The welding enclosure of claim 1, wherein a plurality of door closure magnets are spaced around a circumference of the door frame and the door of the main enclosure entry door assembly and the airlock entry door assembly.

3. The welding enclosure of claim 1, wherein an elastomeric sealing strip extends around a circumference of where at least one of the door of the main enclosure entry door assembly and the door of the airlock entry door assembly engages its respective door frame.

4. The welding enclosure of claim 1, wherein the door closure magnets are positioned on an interior side of the door of the main enclosure entry door assembly and an interior side of the door of the airlock entry door assembly.

5. The welding enclosure of claim 4, wherein ferrous metal tabs are positioned on an interior side of each of the door frames of the main enclosure entry door assembly and the airlock entry door assembly approximately opposite the door closure magnets.

6. The welding enclosure of claim 1, wherein at least 5 lbs. of force on a door handle is required to overcome an attractive force of the door closure magnets of the main enclosure entry door assembly and the airlock entry door assembly.

7. The welding enclosure of claim 6, wherein the attractive force of the door closure magnets is less than 50 lbs.

8. The welding enclosure of claim 1, wherein the door of the main enclosure entry door assembly has a series of vent slots formed therein, and an interior surface of the door has a spark filter positioned over the vent slots.

9. The welding enclosure of claim 1, wherein an optical flame detector is positioned on an interior surface of the main enclosure housing and is configured to direct a flame detection signal to a control panel positioned outside the main enclosure housing.

10. The welding enclosure of claim 9, wherein the optical flame detector generates a detection signal upon sensing light in the UV or IR spectrum.

11. The welding enclosure of claim 9, wherein the optical flame detector includes a temporary connector allowing the optical flame detector to be positioned at different locations within the main enclosure housing.

12. The welding enclosure of claim 11, wherein the temporary connector is one of a hook, a clamp, or a section of hook-and-loop connector material.

13. The welding enclosure of claim 1, wherein the metal door frames and the metal doors of the main enclosure entry door assembly and the airlock entry door assembly are formed primarily of aluminum or an alloy thereof.

14. The welding enclosure of claim 1, wherein the door frame of the main enclosure entry door assembly is connected to the main enclosure housing by the-hook-and-loop connector material.

15. The welding enclosure of claim 1, wherein the airlock chamber has a length allowing at least 3 feet of spacing between the door frame of the main enclosure entry door assembly and the door frame of the airlock entry door assembly.

16. The welding enclosure of claim 1, wherein the welding enclosure includes a frame assembly covered by the flexible, fire-resistant fabric.

17. The welding enclosure of claim 4, wherein an elastomeric sealing strip extends around a circumference of the door of the main enclosure entry door assembly and the door of the airlock entry door assembly and extends further away from each door than the door closure magnets by at least $\frac{1}{8}^{th}$ of an inch.

18. A welding enclosure comprising:

(a) a main enclosure housing comprising a flexible, fire-resistant fabric; and (b) a main enclosure entry door assembly including: (i) a door frame releasably connected to the main enclosure housing; (ii) a door hinged to the door frame; and (iii) door closure magnets positioned on at least one of the door and the door frame in order to magnetically hold the door to the door frame in a closed position;

(c) an airlock chamber connected to the main enclosure housing; and (d) an airlock entry door assembly including: (i) a door frame releasably connected to the airlock chamber; (ii) a door hinged to the door frame; (iii) door closure magnets positioned on at least one of the door and the door frame in order to magnetically hold the door to the door frame in a closed position.

19. The welding enclosure of claim 18, wherein the door closure magnets are spaced around an edge of an interior side of at least one of the door frame and the door of the main enclosure entry door assembly.

20. The welding enclosure of claim 19, wherein ferrous metal tabs are positioned on an interior side of at least one of the door frame and the door of the main enclosure entry door assembly approximately opposite the door closure magnets.

21. The welding enclosure of claim 18, wherein an elastomeric sealing strip extends around a circumference the door of the main enclosure entry door assembly.

22. The welding enclosure of claim 18, wherein the door frame of the main enclosure entry door assembly is connected to the main enclosure housing by a hook-and-loop connector material.

* * * * *